United States Patent
Caspers et al.

(10) Patent No.: US 11,320,199 B2
(45) Date of Patent: May 3, 2022

(54) EVAPORATION DRYER AND METHOD FOR OPERATING SAME

(71) Applicant: BMA BRAUNSCHWEIGISCHE MASCHINENBAUANSTALT AG, Braunschweig (DE)

(72) Inventors: Gerald Caspers, Meine (DE); Hartmut Hafemann, Lehrte (DE)

(73) Assignee: BMA BRAUNSCHWEIGISCHE MASCHINENBAUANSTALT AG, Braunschweig (DE)

( * ) Notice: Subject to any disclaimer, the term of this patent is extended or adjusted under 35 U.S.C. 154(b) by 75 days.

(21) Appl. No.: 16/613,829

(22) PCT Filed: May 14, 2018

(86) PCT No.: PCT/EP2018/062336
§ 371 (c)(1),
(2) Date: Nov. 15, 2019

(87) PCT Pub. No.: WO2018/210724
PCT Pub. Date: Nov. 22, 2018

(65) Prior Publication Data
US 2020/0182544 A1    Jun. 11, 2020

(30) Foreign Application Priority Data
May 15, 2017   (DE) .................... 10 2017 110 534.4

(51) Int. Cl.
*F26B 3/00*   (2006.01)
*F26B 3/084*   (2006.01)
(Continued)

(52) U.S. Cl.
CPC .............. *F26B 3/084* (2013.01); *F26B 17/10* (2013.01); *F26B 21/005* (2013.01); *F26B 21/04* (2013.01); *F26B 23/00* (2013.01); *F26B 23/10* (2013.01)

(58) Field of Classification Search
CPC ........ F26B 3/084; F26B 17/10; F26B 21/005; F26B 21/04; F26B 23/00; F26B 23/10; F26B 23/001; Y02P 80/15; Y02P 70/10
(Continued)

(56) References Cited

U.S. PATENT DOCUMENTS

| 3,570,134 | A | 3/1971 | Nara |
| 4,330,411 | A | 5/1982 | Florín et al. |
| 9,944,875 | B2 * | 4/2018 | Edel .......................... F26B 3/08 |
| 10,126,050 | B2 * | 11/2018 | Jensen ...................... F26B 3/02 |

(Continued)

FOREIGN PATENT DOCUMENTS

| CN | 2268237 Y | 11/1997 |
| CN | 1828205 A | 9/2006 |

(Continued)

OTHER PUBLICATIONS

Baelz et al: "Compressing steam helps world and wallet: Down with the white team plumes!", Sep. 16, 2013.

*Primary Examiner* — John P McCormack
(74) *Attorney, Agent, or Firm* — WCF IP

(57) ABSTRACT

The invention relates to an evaporation dryer (1) for drying particles, having—a process chamber (10) with at least one product inlet (11) for supplying the particles to be dried into the process chamber (10) and a product outlet (12) for discharging dried particles from the process chamber (10), —a heat exchanger (20) arranged within the process chamber (10), —having at least one inlet (21, 211) into the heat exchanger (20) for pressurized steam as process steam and at least one condensate outlet (22, 222) from the heat exchanger (20), wherein—the at least one condensate outlet (Continued)

(22, 222) is connected to an expansion tank (30), wherein at least one pump (40) is connected to the expansion tank (30), and the expanding steam is pumped out of the expansion tank (30) and supplied to the process steam.

5 Claims, 1 Drawing Sheet

(51) Int. Cl.
*F26B 17/10* (2006.01)
*F26B 21/00* (2006.01)
*F26B 21/04* (2006.01)
*F26B 23/00* (2006.01)
*F26B 23/10* (2006.01)

(58) Field of Classification Search
USPC .............................................. 34/470, 467–469
See application file for complete search history.

(56) References Cited

U.S. PATENT DOCUMENTS

| | | |
|---|---|---|
| 2008/0127507 A1 | 6/2008 | Bindelle |
| 2008/0189976 A1 | 8/2008 | Lothar et al. |
| 2014/0017732 A1 | 2/2014 | Lane et al. |
| 2016/0348023 A1 | 12/2016 | Edel et al. |

FOREIGN PATENT DOCUMENTS

| | | | | |
|---|---|---|---|---|
| CN | 101631473 | * | 1/2010 | ............... A23K 1/06 |
| CN | 106288724 A | | 1/2017 | |
| DE | 19612186 A1 | | 10/1997 | |
| EP | 0 273 406 A2 | | 7/1988 | |
| EP | 0273406 A2 | * | 7/1988 | ............. F26B 3/084 |
| EP | 2 801 779 A1 | | 11/2014 | |
| EP | 3 249 328 A1 | | 11/2017 | |
| JP | 2015 014387 A | | 1/2015 | |
| JP | 2015014387 | * | 1/2015 | ............. F26B 3/084 |
| JP | 2015014387 A | | 1/2015 | |
| RU | 2039918 C1 | | 7/1995 | |
| RU | 2592150 C2 | | 7/2016 | |
| UA | 35967 U | | 10/2008 | |

* cited by examiner

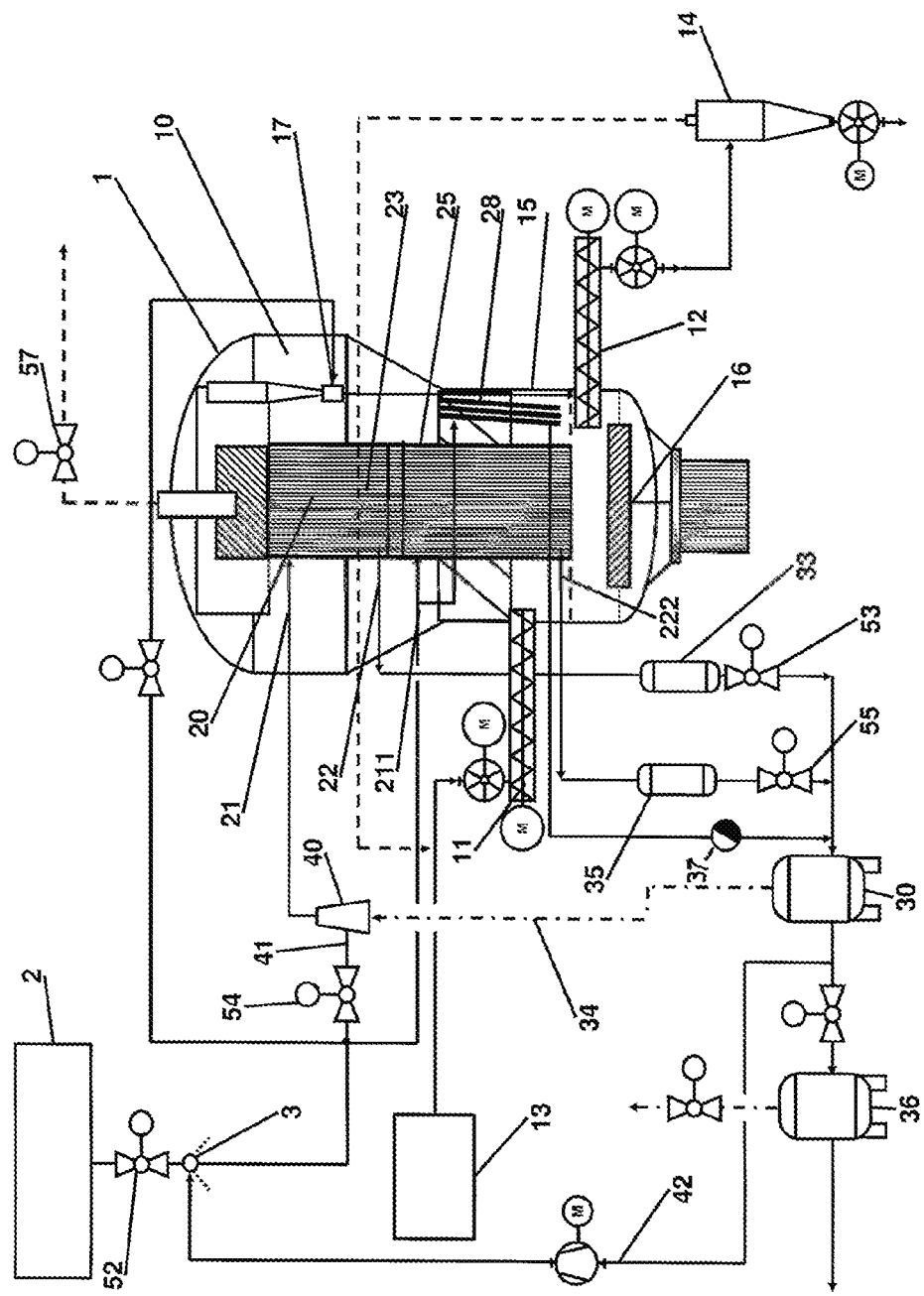

EVAPORATION DRYER AND METHOD FOR OPERATING SAME

FIELD OF THE INVENTION

The invention relates to an evaporation dryer for the drying of particles, comprising a process chamber having at least one product inlet for the feeding of particles to be dried into the process chamber and having a product outlet for the evacuation of dried particles from the process chamber, comprising a heat exchanger arranged within the process chamber, comprising at least one inlet into the heat exchanger for highly pressurized steam as heating steam, in particular from a steam generating device, and a condensate outlet from the heat exchanger, wherein the condensate outlet is connected to an expansion tank. The invention also relates to a method for operating such an evaporation dryer. The evaporation dryer serves, in particular, for the drying of fluidizable particles, for instance of chips in the production of sugar from sugar beets, yet can also be used in the drying of other particles or particle-like products. The evaporation dryer can be used in the food industry, as well as in the drying of preliminary products or of intermediate products or for the drying of slurry.

BACKGROUND

Within an industrial production, it is often the case that the required electrical energy is generated independently. To this end, in a dedicated steam generating device is produced highly pressurized heating steam, which is supplied to a turbine in order thus to generate, with the aid of a generator, the required electric current for the factory, for instance for the sugar factory. By a highly pressurized steam is understood steam which is under a high overpressure. Besides the generation of electrical energy, heating steam is also required for the drying of products or particles as a heat source, for instance for an evaporation dryer, in particular a fluidized-bed evaporation dryer. It is here important to find a balance in order to provide the consuming units, namely the turbine and the evaporation dryer, with the necessary steam quantity in the necessary quality. In order to ensure this, in the steam generating device or boiler house the pressure could be increased, which cannot, however, be realized at will. Often an increased steam pressure presupposes the construction of a new boiler house, which is associated with very high costs. Another possibility consists in better exploiting the heat potential of the heating steam condensate, thus of that condensate which arises from the steam which has been passed through the heat exchanger in the evaporation dryer and which has cooled down during the warming of the product to be dried.

From EP 2 801 779 A1, a method and a system for the drying of particles is known, in which heating steam is supplied to an evaporation dryer for the drying of moist particles is supplied into a closed container to a heat exchanger. The heat exchanger is arranged within the closed tank. The tank has an upper and a lower cylindrical part. Moreover, the heat exchanger has channels which enable the heating of vapor which arises from the evaporation of the water from the product. The heat exchanger is of two-stage configuration, wherein the first heat exchanger part is arranged above the second heat exchanger part and the channels for the vapor lead through the first and second heat exchanger. The heating of the vapor is realized indirectly by the condensation of the heating steam in the lower heat exchanger. The resulting condensate is passed through the upper heat exchanger, the so-called recuperator, cools down there, and delivers a part of its thermal energy indirectly to the vapor in the process chamber.

Additional pumps are herein required. The heat transfer between the condensate and the tubes in the recuperator is heavily dependent on the flow velocity of the condensate. Moreover, this design calls for an increased amount of pump capacity. Furthermore, as a result of the division into a steam heat exchanger and a condensate heat exchanger, the flexibility of the plant is heavily restricted.

If both a turbine and an evaporation dryer are operated with the steam from just one steam generating device, the steam pressure within the steam generating device or within the boiler house for the feeding of the turbine is usually kept constant, since turbines react comparatively sensitively to pressure fluctuations. An altered steam requirement of the evaporation dryer is therefore realized by the throttling of the steam pressure, whereupon, however, drying potential is destroyed.

SUMMARY

The object of the present invention is to reduce the steam requirement of an evaporation dryer.

According to the invention, this object is achieved by an apparatus having the features of the main claim. Advantageous embodiments and refinements of the invention are disclosed in the subclaims, the description and the FIGURE.

The steam dryer according to the invention for the drying of particles, in particular of fluidizable particles such as wood chips or beet extraction chips, comprising a process chamber having at least one product inlet for the feeding of particles to be dried into the process chamber and having a product outlet for the evacuation of dried particles from the process chamber, comprising a heat exchanger arranged within the process chamber, comprising at least one inlet into the heat exchanger for highly pressurized steam as heating steam, in particular from a steam generating device, and comprising at least one condensate outlet from the heat exchanger, wherein the condensate outlet is connected to an expansion tank, provides that to the expansion tank there is connected at least one pump, which pumps off flash steam from the expansion tank, condenses it and supplies it to the heat exchanger. The highly pressurized steam which is used in the drying of particles condenses, due to the comparatively high pressure, at a comparatively high temperature level, and the resulting condensate is collected in a tank.

In a single-stage heat exchanger, a pressure corresponding to the heating steam pressure in the heat exchanger obtains at the condensate tank. For the generation of flash steam, downstream of the condensate tank are connected a control valve, for reducing the pressure, and an expansion tank. The resulting flash steam is pumped off from the expansion tank by means of a pump and fed to the heat exchanger. The suction effect of the pump provides the possibility of recovering a comparatively large amount of flash steam from the outflowing condensate of the heat exchanger and to make it available once again, at an elevated pressure, to the dryer heating system. As result of the reduction of the pressure in the expansion tank, the quantity of the flash steam is increased and, at the same time, the temperature of the condensate is lowered. The increase in pressure of the flash steam is realized by a pump, for example a steam jet pump or a mechanical steam compression. Where a steam jet pump is used, the heating steam is used as the motive medium. Through the addition of the flash steam to the heating steam, the available quantity of heating steam is increased and the quantity of heating steam required by the steam generating device is correspondingly reduced.

In an advantageous embodiment of the invention, the pump is configured as a steam jet pump having a motive steam port, wherein a partial flow of the heating steam initially obtains at the motive steam port. The advantage of using a steam jet pump consists in the fact that it operates in a maintenance-free manner and does not require moving parts. It is thereby possible, solely by virtue of the used heating steam which is required for the drying, to recover flash steam from the condensate of the heat exchanger.

Depending on the desired degree of recycling of the flash steam, different quantities of heating steam can be supplied as motive steam to the steam jet pump, so that a variable admixture and exploitation of the energy present in the flash steam is able to be realized.

As an alternative to an embodiment of the suction pump as a steam jet pump, it is also possible to design the pump as a mechanical suction pump, which is operated via a motor drive, in particular via an electromotive drive. A drawback with this would be the increased maintenance costs in relation to a steam jet pump, due to the moving parts of a mechanical suction pump, yet, thereby a mechanical pump, parameters of the flash steam which is to be fed in can be very precisely set.

In a refinement of the invention, it is provided that the heat exchanger is of multi-stage, in particular two-stage, construction, and to a first stage mixed steam consisting of the heating steam and flash steam, and to a second stage heating steam without the admixture of flash steam, is or can be fed. The combination of the multi-stage, in particular two-stage, heat exchanger with a pump for increasing the pressure of the flash steam enables the exploitation of the flash steam of all condensates. The embodiment of the evaporation dryer with a multi-stage or two-stage heat exchanger has the advantage that the stages can be subjected to differently high heating steam pressures. Equally, the possibility exists that the heat exchanger stages are operated with unmixed heating steam in order to maximize the drying performance. By virtue of this variability, the evaporation dryer can be operated both with optimum performance and with optimum energy efficiency.

Advantageously, the heat exchanger is operated in a counterflow process or an approximate counterflow process, wherein the first stage in a vertical evaporation dryer is arranged at the top, operated with mixed steam, while the second stage or further stages are subjected to a higher steam pressure and arranged at the bottom. In a two-stage structure, the second stage of the heat exchanger is preferredly subjected to the higher heating steam pressure. Since both stages of the heat exchanger are subjected to steam, the option remains of boosting the dryer performance by increasing the pressure of the first stage. This is done by reducing the admixture of flash steam in the first stage, which means, however, that the advantages of steam savings are able to be realized only to a restricted extent. By varying the feed-in quantity, the possibility exists, however, of adapting the evaporation dryer in terms of its performance and, in a borderline case, of operating both or all heat exchanger stages at the same pressure.

With the evaporation dryer according to the invention, the possibility exists, with just a steam quality from the steam-providing device, of operating a divided heat exchanger and of, by way of the degree of additional feed-in of heating steam into the upper heat exchanger, achieving a variation in drying performance. Where a steam jet pump is used as the suction pump, the flash steam is increased in terms of its pressure by the motive steam, so that, due to the increase in pressure of the flash steam in the steam jet pump, the overall size of the first stage of the heat exchanger can be kept comparatively small.

If the heat exchanger is operated on a two-stage or multi-stage basis, condensate accumulates in both or all stages. A refinement of the invention provides that to the two or all stages are assigned separate condensate tanks, which are in this case coupled to the expansion tank. The condensate which accumulates in the stages can be utilized by an amalgamation of the condensate, so that a multiple utilization of the condensate can be enabled and, from the common mixed condensate, in the course of the expansion, still utilizable flash steam can be recovered.

Further condensate can be supplied from heating surfaces, or heating devices consisting of heating surfaces situated in the process chamber or outside the process chamber, to the expansion tank directly or via condensate tanks, and the thus resulting flash steam can be provided to the upper heat exchanger. To this end, appropriate condensate lines are provided from the process chamber to the expansion tank or the condensate tanks.

The condensate tanks are preferredly coupled to the expansion tank via a control valve in order to reduce the pressure level of the expansion tank. The condensate tanks have a pressure level equating to the pressure of the respectively connected heat exchanger. The common expansion tank preferably has a pressure level which lies beneath the pressure level of the heating steam or of the heat exchanger, and thus also a lower temperature compared with the temperature and the pressure level in the condensate tanks or in the heat exchanger.

In order to make the utilization of the highly pressurized steam more flexible, a plurality of steam jet pumps can be connected in parallel, so that even comparatively large quantities of flash steam can be compressed with the heating steam. Particularly in production stages involving partial load, it is sensible to switch off individual steam jet pumps.

In a preferred embodiment of the evaporation dryer, this is configured as a fluidized-bed evaporation dryer, which forms a ring-like process chamber. In a cylindrical embodiment of an outer casing of the evaporation dryer and a substantially circular arrangement of the centrally disposed heat exchanger, where appropriate also of the two-stage heat exchanger, there is formed an annular process chamber, which is provided with a conveying device for feeding a fluidizing agent, in particular steam, from below into the process chamber. Within the process chamber are formed, preferredly by vertically or angularly extending walls, vertically extending cells, in which the product to be dried and fluidized, for instance wood chips or other particles, is found. In a cell, the moist product to be dried is introduced, for instance via a star feeder or a similar conveying device. From this charge cell, the product to be dried is transported along the ring-like process chamber from cell to cell. The transport direction is here substantially defined by a pressure drop in the fluidized bed, which pressure drop forms from the inlet cell to a discharge cell, at the lower end of which is arranged the product outlet. In the discharge cell, no fluidization or a reduced fluidization is realized. If the floor is closed, no fluidization takes place. If a reduced fluidization is desired, this is realized by a slight perforation of the floor. The cells are open at their upper ends, so that the product moves via the respective upper ends of the cell walls from one cell to the other until the product makes its way in a dried state to the discharge cell, in which it falls downward and is discharged there, for instance by a star feeder and/or an appropriate discharge device such as a worm conveyor. Furthermore, the cell walls can have lower openings, through which a part of the product is transported from one cell into the adjacent cell. In the process chamber, an overpressure can prevail, though it is in principal also possible for the evaporation dryer to work also at atmospheric pressure. The ring-like process chamber can also be of conical configuration and have between the outside wall and the inside wall a constant or varying, in particular upwardly increasing distance. The fluidized-bed evaporation dryer can also be configured as a purely cylindrical construction without a conical intermediate piece.

From the expansion tank for condensate, a connecting line can lead to a mixing point, which is arranged downstream of the steam generating device. In this connecting line, condensate from the expansion tank or from condensate tanks is mixed with the heating steam which comes directly out of a steam generating device or turbine, whereby an increase in steam quantity, alongside a simultaneous reduction in temperature and, where appropriate, a reduction in pressure of the heating steam, is obtained. By way of this admixture of the condensate in the region of the mixing point, a consistent quality of the heating steam which is supplied to the heat exchanger or heat exchangers and pump can be ensured, even if there are fluctuations in the steam quality from the pressure generating device. In addition, by way of the quantity of the admixture, the respectively desired steam quality can be adjusted should the dryer performance have to be adapted to the product to be dried.

Between the pump and the steam generating device can be arranged a control valve.

The invention likewise relates to a method for operating an evaporation dryer for the drying of particles, comprising a process chamber having at least one product inlet, through which particles to be dried are introduced into the process chamber space, and having a product outlet, through which dried particles are evacuated from the process chamber, comprising a heat exchanger, which is preferably arranged within the process chamber and into which, via at least one inlet, highly pressurized steam is passed as heating steam, in particular from a steam generating device, and from which, through at least one condensate outlet, condensate is led off and supplied to an expansion tank, wherein from the expansion tank flash steam is pumped off via at least one pump and supplied to the heating steam. The evaporation dryer is constructed substantially as described above, the steam quantity required by the steam generating device being able to be reduced, and an adaptation to the required performance achieved, by the passage of flash steam to the heating steam.

Heating steam can here be fed to the evaporation dryer from different sources in different qualities. In the case of a multi-stage structure, different steam qualities can be fed to different heat exchanger stages. The steam qualities can be provided from one or various steam generating devices. For instance, steam from a turbine can also be used.

BRIEF DESCRIPTION OF THE DRAWING

An illustrative embodiment of the invention is explained in greater detail below with reference to the single FIGURE.

The FIGURE is a schematic representation of an evaporation dryer plant with a fluidized-bed evaporation dryer.

DETAILED DESCRIPTION

In the FIGURE, an evaporation dryer 1 in the form of a fluidized-bed evaporation dryer is represented. The evaporation dryer 1 has a process chamber 10 having a product inlet 11 for the feeding of particles to be dried, for instance wood chips, chips, pellets or other fluidizable particles having a moisture content which is to be reduced. Upstream of the product inlet 11 can be arranged devices for feeding the particles out of a store 13, in the represented illustrative embodiment these are a star feeder and a worm conveyor, which are both operated by motorized means. At the product outlet 12, a motor-driven worm conveyor and a star feeder, which convey the ready dried product into an expansion cyclone 14, are arranged in reverse order. The structure of the fluidized-bed evaporation dryer 1 provides a substantially cylindrical housing 15 having a heat exchanger 20 which is arranged centrally therein and which can be formed of a multiplicity of heat exchanger elements. As an alternative to a substantially cylindrical housing 15, this can also be of conically tapered configuration or be formed of a combination of cylindrical and conical portions. The heat exchanger 20 forms together with the cylindrical housing 15 the ring-like process chamber 10. Insofar as the heat exchanger 20 too has a round outer contour, the process chamber 10 is annular, while, in principle, also polygonal inner and outer contours of the process chamber 10 are possible. Outside the evaporation dryer 10, a control valve 57 for the dryer pressure is arranged. By way of a conveying device 16, a fluidizing agent in the form of vapor or steam is passed from below through a sieve tray on the underside of the process chamber 10. Within the process chamber 10 are arranged vertical walls, or walls inclined in the direction of conveyance, so that the annular process chamber 10 is divided into individual cells. The walls can reach right up to the sieve tray and enable at their upper ends, and, where appropriate, at further openings (not represented), a transfer to adjacent cells, so that the fluidized product or the fluidized particles are transported from the product inlet 11 to the product outlet 12 through the whole of the process chamber 10. It is advantageous if the inlet cell lies directly next to the outlet cell, so that the product must move once around the heat exchanger 20 through the process chamber 10. As soon as the discharge cell is reached, the dried product can there be transported away by the appropriate conveying devices. This structure is fundamentally known, for instance from EP 1 956 326 A1.

In the represented illustrative embodiment, the heat exchanger 20 is of two-stage configuration and has two inlets 21, 211, via which heating steam is passed from a steam generating device 2, for instance a boiler house, which provides highly pressurized heating steam on the one hand for operating a turbine for the generation of electrical energy and on the other hand for providing steam for the drying of the particles, into the heat exchanger 20. The respective inlet 21, 211 is arranged in the upper part of the respective heat exchanger stage or superheater stage. On the respective underside of the vertically oriented heat exchanger stages 23, 25 are arranged the corresponding condensate outlets 22, 222. The condensate outlets 22, 222 lead to separate condensate tanks 33, 35, in which the condensate coming from the respective heat exchanger stage 23, 25, which condensate is under the operating pressure of the heat exchanger, is collected. On the outlet side, to each condensate tank 33, 35 is assigned a control valve 53, 55, via which the condensate to be evacuated is regulated in terms of the fill level in the condensate tank 33, 35. From the condensate tanks 33, 35, lines lead to a common expansion tank 30, in which the condensate from both heat exchanger stages 23, 25 and, where appropriate, from heating surfaces (not described in detail) is collected. In the expansion tank 30, a pressure which is lower than the operating pressure of the heat exchanger 20 prevails. The condensate collected therein has a substantially lower temperature than the condensate in the condensate tanks 33, 35, and a likewise lower temperature in comparison to the heating steam. The temperature difference dictates the formation of flash steam.

In the process chamber 10 are additionally arranged internal heating surfaces 28 or heating plates, in which condensate can likewise form, which condensate is conducted via a condensate line, having a built-in condensate drain 37, to the expansion tank 30. As an alternative to a direct supply line, condensate from the heating surfaces 28 can also be conducted via the condensate tanks 33, 35 for the heat exchanger stages 23, 25 to the expansion tank 30.

From the expansion tank 30, a flash steam line 34 leads to a suction pump 40, which in the represented illustrative embodiment is configured as a steam jet pump. At the steam jet pump 40, heating steam from the steam generating device 2 is present at a motive steam port 41, so that the heating steam is supplied as motive steam to the steam jet pump 40. Upstream of the steam jet pump 40 is connected a control valve 54, in order to be able to control the operating pressure of the motive steam. Within the steam jet pump 40, the heating steam is mixed with the flash steam from the expansion tank 30, so that the condensate, which due to the suction process by the steam jet pump 40 has turned back into steam, mixes as flash steam with the heating steam. The quantity of steam fed to the first heat exchanger stage 23 is thereby increased.

Before the control valve 54, the heating steam line branches off from the steam providing device 2. Via an upper line branch, a partial flow is conducted via a control valve for driving an ejector 17 within the process chamber 10. A substantially greater steam quantity is conducted into the second heat exchanger stage 25, which is arranged beneath the first, upper heat exchanger stage 23. At the second heat exchanger stage 25, a higher steam pressure obtains than in the first heat exchanger stage 23. By way of the quantity of the admixed flash steam from the expansion tank 30, it is possible to set different pressures for the first heat exchanger stage 23, so that an adaptation to the respectively different heat requirement is possible and the dryer performance, in particular in a partial load operation, is easily adjustable. For an elevation of the dryer performance, the fed quantity of flash steam is reduced, so that, in extremis, both heat exchanger stages 23, 25 are able to be operated with the unmixed heating steam.

From the expansion tank 30, or alternatively, in a variant (not represented), from other condensate tanks, a condensate line 42 leads to a mixing point 3, in which condensate is admixed to the original heating steam from the steam providing device 2 after the heating steam has passed through a control valve 52. It is thereby possible to adjust, according to requirement, the quality of the steam fed to the evaporation dryer 1, in particular to lower the pressure and the temperature and to increase the total steam quantity.

Downstream of the expansion tank 30 is connected a further tank 36 for receiving condensate at a lower temperature and a lower pressure, which condensate can continue to be used.

REFERENCE SYMBOL LIST 1 evaporation dryer
2 steam generating device
3 mixing point
10 process chamber
11 product inlet
12 product outlet
13 store
14 expansion cyclone
15 cylindrical housing
16 conveying device
17 ejector
20 heat exchanger
21 heating steam inlet, upper heat exchanger
22 condensate outlet, upper heat exchanger
23 upper heat exchanger
25 lower heat exchanger
28 internal heating surfaces
30 expansion tank
33 condensate tank, upper heat exchanger
34 flash steam line
35 condensate tank, lower heat exchanger
36 condensate tank
40 pump
41 motive steam port
42 condensate line to the mixing point
53 control valve, upper heat exchanger
54 control valve for motive steam
55 control valve, lower heat exchanger
57 control valve for dryer pressure
211 heating steam inlet, lower heat exchanger
222 condensate outlet, lower heat exchanger

The invention claimed is:

1. An evaporation dryer for the drying of particles, comprising:
    a process chamber having at least one product inlet for feeding of particles to be dried into a process chamber space and having a product outlet for evacuation of dried particles from the process chamber;
    a heat exchanger arranged within the process chamber, the heat exchanger comprising
        at least one inlet for highly pressurized steam as heating steam and at least one condensate outlet connected to an expansion tank,
    wherein the expansion tank is connected to at least one pump which pumps off flash steam from the expansion tank and supplies the flash steam to the heating steam,
    wherein the heat exchanger is of multi-stage construction having at least a first stage and a second stage,
    wherein to the first stage comprises a mixed steam of the heating steam and the flash steam, and
    wherein the second stage is configured such that the heating steam is fed to the heat exchanger.

2. The evaporation dryer as claimed in claim 1, wherein the first and second stages are assigned separate condensate tanks which are coupled to the expansion tank.

3. The evaporation dryer as claimed in claim 2, wherein the separate condensate tanks are coupled to the expansion tank via a control valve.

4. The evaporation dryer as claimed in claim 2, wherein the separate condensate tanks each have a pressure level equating to or below a pressure of the heating steam.

5. The evaporation dryer as claimed in claim 2 further comprising a connecting line from the expansion tank leads to a mixing point arranged downstream of a steam generating device, wherein the heating steam is mixed with condensate from the expansion tank and/or the separate condensate tanks in the mixing point.

* * * * *